(12) United States Patent  (10) Patent No.: US 7,458,996 B2
Ogura et al.  (45) Date of Patent: Dec. 2, 2008

(54) RECHARGEABLE LITHIUM BATTERY AND PROCESS FOR THE PRODUCTION THEREOF

(75) Inventors: Takao Ogura, Souraku-gun (JP); Soichiro Kawakami, Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 11/227,146

(22) Filed: Sep. 16, 2005

(65) Prior Publication Data

US 2006/0006837 A1    Jan. 12, 2006

Related U.S. Application Data

(62) Division of application No. 11/087,558, filed on Mar. 24, 2005, now Pat. No. 7,060,117, which is a division of application No. 09/676,090, filed on Oct. 2, 2000, now Pat. No. 6,924,059.

(30) Foreign Application Priority Data

Sep. 30, 1999 (JP) ............................... 11-280571

(51) Int. Cl.
*H01M 2/02* (2006.01)
(52) U.S. Cl. ...................... 29/623.2; 29/623.1; 429/176
(58) Field of Classification Search ........................ None
See application file for complete search history.

(56) References Cited

U.S. PATENT DOCUMENTS 5,059,885 A * 10/1991 Weiss et al. ................. 320/115
6,218,041 B1  4/2001 Barbier et al. .............. 429/96
6,242,130 B1  6/2001 Noh et al. ................... 429/175
6,242,131 B1  6/2001 Noh ............................ 429/185
6,387,567 B1  5/2002 Noh ............................ 429/211
6,632,538 B1 10/2003 Yamazaki et al. ........... 428/461

FOREIGN PATENT DOCUMENTS

| FR | 920314    | 4/1947 |
| JP | 59-018576 | 1/1984 |
| JP | 09-213286 | 8/1997 |
| JP | 11-260320 | 9/1999 |

\* cited by examiner

*Primary Examiner*—John S Maples
(74) *Attorney, Agent, or Firm*—Fitzpatrick, Cella, Harper & Scinto

(57) ABSTRACT

A thin rechargeable lithium battery having a battery main body enclosed between sealing members (a) and (b), at least sealing member (a) having a concave portion that extends to either side from a central position so as to have a peripheral collar portion (a-i) which surrounds the concave portion, sealing member (b) having a peripheral collar portion (b-i) corresponding to the collar portion (a-i) of sealing member (a) and the two sealing members (a) and (b) being opposingly arranged such that the face of said concave portion of sealing member (a) faces sealing member (b) through the battery main body, wherein collar portions (a-i) and (b-i) are mutually welded, and either sealing member (a) or (b) is provided with a power output terminal having electrical continuity with the battery main body and an insulating portion for insulating said terminal.

5 Claims, 10 Drawing Sheets

RECHARGEABLE LITHIUM BATTERY AND PROCESS FOR THE PRODUCTION THEREOF

This application is a divisional of Application No. 11/087,558, filed Mar. 24, 2005, now U.S. Pat. No. 7,060,117, which is a divisional of Application No. 09/676,090, filed on Oct. 2, 2000, now U.S. Pat. No. 6,924,059, both of which are incorporated herein by reference.

BACKGROUND OF THE INVENTION

1. Field of the Invention

The present invention relates to a rechargeable lithium battery preferably shaped in a thin form and a process for producing said rechargeable lithium battery.

2. Related Background Art

In recent years, the global warming of the earth because of the so-called greenhouse effect due to an increase in the content of $CO_2$ gas in the air has been predicted. For instance, in thermal electric power plants, thermal energy obtained by burning a fossil fuel is being converted into electric energy, and along with burning of such fossil fuel, a large amount of $CO_2$ gas is being exhausted in the air. Accordingly, in order to suppress this situation, there is a tendency of prohibiting to newly establish a thermal electric power plant. Under these circumstances, so-called load leveling practice has been proposed in order to effectively utilize electric powers generated by power generators in thermal electric power plants or the like, wherein a surplus power unused in the night is stored in rechargeable batteries installed at general houses and the power thus stored is used in the daytime when the demand for power is increased, whereby the power consumption is leveled.

Now, for electric vehicles which do not exhaust any air polluting substances such as $CO_2$, $NO_x$, hydrocarbons and the like, there is an increased demand for developing a high performance rechargeable battery with a high energy density which can be effectively used therein. Besides, there is also an increased demand for developing a miniature, lightweight, high performance rechargeable battery usable as a power source for portable instruments such as small personal computers, word processors, video cameras, and cellular phones.

Under such circumstances, there have been proposed a nickel-metalhydride rechargeable battery and a rechargeable lithium battery which will comply with such demand. And various researches and developments have been made in order to more improve their performances.

For the nickel-metalhydride rechargeable battery, although it is inferior to the rechargeable lithium battery in terms of being relatively heavier, it has advantages in that it can be relatively easily produced at a reduced production cost in comparison with the rechargeable lithium battery. In view of this, nickel-metalhydride rechargeable batteries have been often using as power sources of portable instruments. Besides, nickel-metalhydride rechargeable batteries have started using as power sources of certain electric vehicles.

For the rechargeable lithium battery, there have been proposed various rechargeable lithium batteries having an anode comprising a given anode active material such as a lithium metal, a lithium alloy, a carbonous material, or the like and having a cathode comprising a given cathode active material such as manganese dioxide, lithium-cobalt oxide, lithium-nickel oxide, or the like. These rechargeable lithium batteries have been evaluated as being superior to the nickel-metalhydride rechargeable battery particularly in a viewpoint that they are expected to have a relatively higher energy density.

And researches and developments have been made of these rechargeable lithium batteries in order to put to practical use. Some of them have been practically using as power sources of particularly portable instruments.

Incidentally, for the configuration of such rechargeable battery used in a portable instrument, a cylindrical shape or a prismatic shape is adopted in many cases. In the case of a prismatic rechargeable battery, it can be designed to be thinner than a cylindrical rechargeable battery. Thin-shaped prismatic rechargeable batteries have been often using in compact portable instruments.

Now, a cylindrical rechargeable battery is generally prepared in the following manner. A separator is sandwiched between an anode and a cathode such that the separator is partly protruded at each end side, followed by spirally winding about a given axis so as to form a cylindrical body comprising the separator/the cathode/the separator/the anode/the separator. The cylindrical body is inserted in a cylindrical battery vessel through its opening. A necking is formed in the vicinity of the opening of the battery vessel. Then, an electrolyte solution is introduced into the battery vessel so that the separator is impregnated with the electrolyte solution. Thereafter, a capping capable of serving also as an external terminal and which is provided with an internal pressure release vent, a PTC (positive temperature coefficient device), and a current-shutoff device is put on the necked portion of the battery vessel so as to cover the opening, followed by being caulked through a packing. By this, there is obtained a cylindrical rechargeable battery.

A prismatic rechargeable battery is generally prepared, for instance, in the following manner. A separator is sandwiched between an anode and a cathode, followed by winding about a given axis to form a cylindrical body comprising the separator/the cathode/the separator/the anode/the separator. The cylindrical body is shaped into a flat body by means of pressure forming. The flat body is inserted in a prismatic battery vessel through its opening. Then, a capping capable of serving also as an external terminal and which is provided with an internal pressure release vent, a PTC (positive temperature coefficient device), a current-shutoff device, and a liquid introduction port is put on the opening of the prismatic battery vessel, followed by subjecting to laser beam welding to seal the inside of the prismatic battery vessel. Thereafter, an electrolyte solution is introduced into the prismatic battery vessel through the liquid introduction port provided at the capping so that the separator is impregnated with the electrolyte solution. Then, the liquid introduction port is sealed. By this, there is obtained a prismatic rechargeable battery.

Any of the cylindrical battery vessel used in the preparation of the cylindrical rechargeable battery and the prismatic battery vessel used in the preparation of the prismatic rechargeable battery is formed by deep-drawing an appropriate metallic member such as a nickel-plated iron plate, an aluminum plate, or a stainless steel plate.

Particularly in the above method of preparing a prismatic rechargeable battery, it is required to use a relevant prismatic battery vessel, and such prismatic battery vessel is formed by deep-drawing an appropriate metallic member such as a nickel-plated iron plate, an aluminum plate, or a stainless steel plate. In this case, there is a limit for the metallic member which can be processed to form such prismatic battery vessel by way of deep-drawing. Specifically, in the case of using a metallic member such as a nickel-plated iron plate, an aluminum plate, or a stainless steel plate, a prismatic battery vessel formed by way of deep-drawing unavoidably becomes to have a relatively large thickness of about 5 mm or more. This situation is similar also in the case of forming a cylindrical battery vessel by way of deep-drawing.

In order to form a prismatic battery vessel having a thickness which is thinner than aforesaid thickness, it is considered to adopt a method of first forming a prismatic battery vessel by way of deep-drawing and grinding the walls of the prismatic battery vessel in the thickness direction. However, this method results in a remarkable increase in the production cost of a prismatic rechargeable battery and therefore, it is not acceptable in practice.

Separately, when the battery vessel in any case is of a thin thickness, the capping is necessary to have a thin thickness accordingly. When the capping is of a thin thickness of, for instance, less than about 5 mm, it is extremely difficult to work a terminal cap and an insulating mold at the capping and it is also extremely difficult to work a liquid introduction port at the capping. In addition, the battery vessel and the capping are welded by means of laser beam welding in many cases. The welding in this case exerts a thermal adverse effect to the insulating mold situated in the vicinity of the position where the welding is conducted.

Incidentally, in recent years, there has been developed a so-called sheet type rechargeable battery capable of being thinned, comprising a battery main body covered by a laminate film, wherein said battery main body comprises an ion conductor disposed between an anode and a cathode, said ion conductor comprising a separator impregnated with an electrolyte solution, a gelated electrolyte or a solid electrolyte. However, this sheet type rechargeable battery has disadvantages such that because the laminate film is insufficient in terms of the physical strength, the battery is liable to deform or it is liable to be damaged, and therefore, there is a limit for a range where the battery can be used.

FIGS. 10(*a*) and 10(*b*) are schematic views illustrating a rechargeable lithium battery having an armor comprising a laminate film, as an example of aforesaid sheet type rechargeable battery.

Particularly, FIG. 10(*a*) is a schematic perspective view of said rechargeable lithium battery when viewed from the lateral direction, and FIG. 10(*b*) is a schematic cross-sectional view of a peripheral portion of said rechargeable lithium battery, taken along the line D-D, and when viewed from above.

In FIG. 10(*a*), reference numeral 1001 indicates a pair of power output terminals extending from a battery main body 1003 installed in a pack formed using a laminate film 1005. The battery main body 1003 comprises an ion conductor disposed between an anode and a cathode.

As will be understood with reference to FIG. 10(*b*), the laminate film 1005 comprises an aluminum foil 1007 (having a thickness of, for instance, about 10 μm) sandwiched between a pair of plastic films 1006 (having a thickness of, for instance, about 10 μm) which are insoluble in solvents. The aluminum foil 1007 serves to prevent moisture from invading into the battery main body 1003. However, the aluminum foil 1007 is of a thin thickness (about 10 μm), and therefore, there is a tendency in that moisture invasion into the battery main body 1003 cannot be perfectly prevented by the aluminum foil 1007.

The fabrication of a rechargeable lithium battery having such configuration as shown in FIG. 10(*a*) using aforesaid laminate film 1005 is conducted, for instance, in the following manner. There is provided a laminate film 1005 having a prescribed length. The laminate film 1005 is doubled along a prescribed bending line 1004 to form a folded shape having a space between the two bent laminate films, the battery main body 1003 having the two power output terminals 1001 is installed in said space, and a heat-welded portion 1002 is formed in a peripheral portion of the folded shape having the battery main body 1003 having the two power output terminals 1001 enclosed therein to seal the inside. In this case, the peripheral portion of the folded shape in which the heat-welded portion 1002 is formed comprises the two laminate films 1005 stacked. By heating the peripheral portion while applying a prescribed pressure thereto, the adjacent plastic films 1006 of the two laminate films 1005 are mutually heat-fused and welded to form a heat-welded region 1008. In this case, it is difficult to sufficiently seal neighborhood regions of the two power output terminals 1001. In order to sufficiently seal the neighborhood regions of the two power output terminals 1001, it is necessary to increase the heat-welded portion to an extent which is greater than that required. This situation is liable to entail a problem such that the reliability of the battery is deteriorated. Besides, in general, it is necessary for the heat-welded portion to be provided at a width of 5 mm or more. This situation entails a decrease in the capacity density of the battery. In order to prevent the capacity density of the battery from being decreased, there is considered to adopt a manner of bending also the peripheral portion which is to be heat-welded. However, to bend the peripheral portion involved deteriorates the reliability of the laminate film 1005, where a fear of permitting moisture to be invaded into the battery main body is likely to increase.

Japanese Unexamined Patent Publication No. 213286/1997 (hereinafter referred to as "document 1") discloses a rechargeable battery which can make up for such shortcomings as above described. In more detail, document 1 discloses a thin rechargeable lithium battery comprising a (a battery main body) installed in a battery vessel formed by molding a thin metal plate, characterized in that said battery vessel has an opening at the face thereof in parallel to said battery main body, a cover plate is disposed at said opening of the battery vessel, and said cover plate is welded to the battery vessel by mean of laser beam welding.

FIG. 11 is a schematic cross-sectional view illustrating the internal constitution of the rechargeable lithium battery disclosed in document 1. In FIG. 11, reference numeral 1100 indicates a battery main body disposed in a thin battery vessel 1105 whose upper face in parallel to said battery main body 1100 has an opening. Reference numeral 1104 indicates a cover plate disposed so as to cover said opening, where the cover plate 1104 is welded to the battery vessel 1105 by means of laser beam irradiation 1108 to seal the inside of the battery vessel 1105. The battery main body 1100 comprises a stacked body comprising a cathode 1101 and an anode 1102 stacked through a separator 1103.

Document 1 describes that according to the technique described therein, it is possible to prepare a thin rechargeable lithium battery having a thickness of 5 mm or less and having a relatively large area.

However, the rechargeable battery having such configuration as shown in FIG. 11 described in document 1 has disadvantages such that because the cover plate 1104 comprises a simple sheet-like plate whose thickness is thin, the cover plate 1104 is insufficient in terms of the physical strength, and because of this, when a stress is vertically or diagonally applied to the battery vessel 1105, the battery vessel is liable to deform, where there is a fear that the cathode and the anode suffer internal shorts. Besides, there is also a disadvantage such that because laser beam is used when the cover plate 1104 is welded to the battery vessel, the battery main body 1100 is unavoidably exposed to heat generated upon the irradiation of the laser beam, and therefore, in order to protect the battery main body from said heat, it is necessary to provide a heat shielding member 1106 between the battery main body 1100 and a welding portion where the cover plate 1104 and the battery vessel 1105 are welded, as shown in FIG. 11. Reference numeral 1107 indicates an interstice formed when the heat shielding member 1106 is provided.

As the heat shielding member 1106, there is used a thermally conductive member having a thickness of about 0.1 mm and which is made of a metallic material having good thermal conductivity such as Cu, Ni or a stainless steel. Because of this, when the anode or the cathode of the battery main body comprises an anode or cathode active material which is liable to expand upon charging or discharging, or when such stress as above described is applied to the battery vessel, the probability of the occurrence of the internal shorts among the cathode and the anode of the battery main body is increased. Further, since the entire thickness of the rechargeable lithium battery is several millimeters, the thickness (about 0.1 mm) of the heat shielding member 1106 is corresponding to several percentages to 5% of the entire thickness of the rechargeable lithium battery, where the capacity density of the rechargeable lithium battery is decreased by a quantity occupied by the heat shielding member 1106. In the case where the heat shielding member 1106 is made to be in a waved form, the capacity density of the rechargeable lithium battery is more decreased.

SUMMARY OF THE INVENTION

The present invention has been accomplished in view of the foregoing situation in the conventional thin type rechargeable lithium battery.

An object of the present invention is to provide a rechargeable lithium battery which is thinned without using such heat shielding member as used in the prior art.

Another object of the present invention is to provide a thin type rechargeable lithium battery in which the anode and the cathode are not internally shorted even when charging and discharging are alternately repeated over a long period of time and which excels in durability.

A further object of the present invention is to provide a thin type rechargeable lithium battery having a prolonged cycle life (a prolonged charging and discharging cycle life).

A further object of the present invention is to provide a thin type rechargeable lithium battery which comprises a battery main body comprising at least a cathode, an anode, and an ion conductor enclosed between a pair of sealing members (a) and (b), at least said sealing member (a) having a concave portion such that said concave portion is extended to either side of said sealing member (a) from a central position of said sealing member (a) so as to have a peripheral portion which surrounds said concave portion, and said two sealing members (a) and (b) being arranged to oppose to each other such that the face of said concave portion of said sealing member (a) is faced to said sealing member (b) through said battery main body, characterized in that said sealing member (a) has a collar portion (a-i) at said peripheral portion of said concaved portion and said sealing member (b) has a collar portion (b-i) at a region thereof corresponding to said peripheral portion of said sealing member (a) wherein said collar portion (a-i) and said collar portion (b-i) are mutually welded, and either said sealing member (a) or said sealing member (b) is provided with a power output terminal having an electrical continuity with said battery main body and an insulating portion for insulating said power output terminal.

A further object of the present invention is to provide a process for producing said rechargeable lithium battery. Said process typically comprises the steps of providing a battery main body comprising at least a cathode, an anode, and an ion conductor, a first sealing member (a) having a concave portion with a peripheral portion surrounding said concave portion and a collar portion (a-i) at said peripheral portion of said concave portion, and a second sealing member (b) having a collar portion (b-i) at a region thereof which is corresponding to said peripheral portion of said first sealing member (a), arranging said battery main body in said concave portion of said first sealing member (a), mating said first sealing member (a) with said second sealing member (b) to oppose to each other such that the face of said concave portion of said first sealing member (a) is faced to said second sealing member (b) through said battery main body, and mutually welding said collar portion (a-i) of said first sealing member (a) and said collar portion (b-i) of said second sealing member (b).

DESCRIPTION OF THE INVENTION AND PREFERRED EMBODIMENTS

Figure 1:
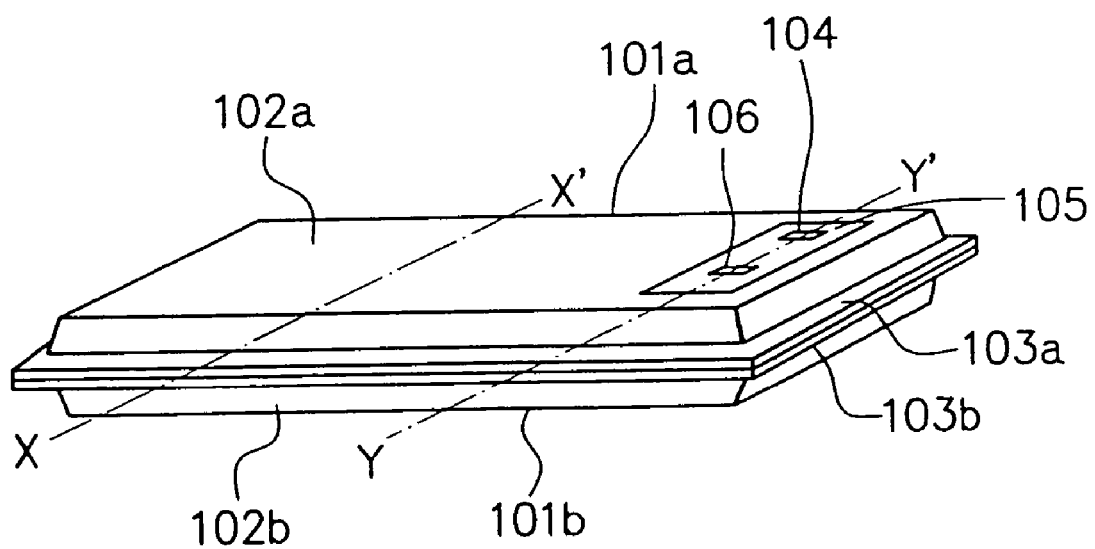
FIG. 1 is a schematic slant view illustrating an example of a rechargeable lithium battery of the present invention.

The present invention attains the above objects and provides a high performance rechargeable lithium battery having improved battery characteristics and a prolonged cycle life (a prolonged charging and discharging cycle life) and a process for producing said rechargeable battery.

A typical embodiment of the rechargeable lithium battery provided according to the present invention comprises a battery main body comprising at least a cathode, an anode, and an ion conductor enclosed between a pair of sealing members (a) and (b), at least said sealing member (a) having a concave portion such that said concave portion is extended to either side of said sealing member (a) from a central position of said sealing member (a) so as to have a peripheral portion which surrounds said concave portion, and said two sealing members (a) and (b) being arranged to oppose to each other such that the face of said concave portion of said sealing member (a) is faced to said sealing member (b) through said battery main body, characterized in that said sealing member (a) has a collar portion (a-i) at said peripheral portion of said concaved portion and said sealing member (b) has a collar portion (b-i) at a region thereof corresponding to said peripheral portion of said sealing member (a) wherein said collar portion (a-i) and said collar portion (b-i) are mutually welded, and either said sealing member (a) or said sealing member (b) is provided with a power output terminal having an electrical continuity with said battery main body and an insulating portion for insulating said power output terminal.

In the rechargeable lithium battery thus constituted, the collar portions (a-i) and (b-i) which are mutually welded are situated outside the space formed by the concave portion of the sealing member (a) and the sealing member (b) where the battery main body is arranged. In this connection, such heat shielding member required to be provided in the space where the battery main body is arranged in the prior art is not necessitated to be provided in the space formed by the concave portion of the sealing member (a) and the sealing member (b) where the battery main body is arranged. Hence, the foregoing problems due to the use of the heat shielding member in the prior art are not occurred. Particularly, in the case where the anode or the cathode of the battery main body comprises an anode or cathode active material which is liable to expand upon charging or discharging, even when charging and discharging are alternately repeated over a long period of time, the anode and the cathode of the battery main body are stably maintained without suffering internal shorts among them. The rechargeable lithium battery always exhibits satisfactory battery characteristics and has a prolonged charging and discharging cycle life.

The present invention provides a process for producing the above-described rechargeable battery.

A typical embodiment of the process comprises the steps of:

providing a battery main body comprising at least a cathode, an anode, and an ion conductor, a first sealing member (a) having a concave portion with a peripheral portion surrounding said concave portion and a collar portion (a-i) at said peripheral portion of said concave portion, and a second sealing member (b) having a collar portion (b-i) at a region thereof which is corresponding to said peripheral portion of said first sealing member (a), arranging said battery main body in said concave portion of said first sealing member (a), mating said first sealing member (a) having said battery main body arranged in said concave portion of said first sealing member (a) with said second sealing member (b) to oppose to each other such that the face of said concave portion of said first sealing member (a) is faced to said second sealing member (b) through said battery main body, and mutually welding said collar portion (a-i) of said first sealing member (a) and said collar portion (b-i) of said second sealing member (b).

In the process thus constituted, the collar portion (a-i) provided at the peripheral portion of the concave portion of the first sealing member (a) and the collar portion (b-i) provided at the region of the second sealing member (b) which is corresponding to said peripheral portion of the second sealing member (b) are mutually welded, the battery main body (comprising at least the cathode, the anode, and the ion conductor) accommodated in the space formed by the concave portion of first sealing member (a) and the second sealing member (b) is desirably prevented from suffering from a thermal influence upon the welding of the two collar portions (a-i) and (b-i). This situation makes it possible to effectively produce a thin type rechargeable lithium battery which excels in battery characteristics and has a prolonged charging and discharging cycle life. In the case where the collar portion (a-i) of the first sealing member (a) and the collar portion (b-i) of the second sealing member (b) are formed by way of metal-processing, each of the first and second sealing members (a) and (b) which are thin becomes strengthened in terms of the physical strength.

In the following, the present invention will be described in more detail with reference to the drawings.

FIG. 1 is a schematic slant view illustrating an example of a rechargeable lithium battery of the present invention.

The rechargeable lithium battery shown in FIG. 1 has an sealing member 101a having a concave portion 102a downward faced and a peripheral collar portion 103a surrounding said concave portion 102a and an sealing member 101b having a concave portion 102b upward faced and a peripheral collar portion 103b surrounding said concave portion 102b, where said sealing member 101a and said sealing member 101b are mated such that said downward faced concave portion 102a and said upward faced concave portion 102b are opposed to each other and said peripheral collar portion 103a and said peripheral collar portion 103b are mutually welded. In the space formed by said downward faced concave portion 102a and said upward faced concave portion 102b, there is accommodated a battery main body comprising at least a cathode, an anode and an ion conductor (not shown). At the sealing member 101a, there are provided a cathode power output terminal 104 extending from the cathode of the battery main body, an anode power output terminal 106 extending from the anode of the battery main body, and an insulating portion 105 for insulating said power output terminal 104 and said power output terminal 106. Although this is not shown in the figure, if necessary, an internal pressure release vent may be additional provided at the sealing member 101a through the insulating portion 105.

Here, as will be understood from FIG. 1, a combination of the sealing member 101a and the sealing member 101b constitutes an armor vessel (or a battery vessel) of the rechargeable lithium battery.

In this embodiment, the concave portion (102a, 102b) is provided at each of the two sealing members 101a and 101b. This is not limitative. The concave portion may be provided only at one of the two sealing members 101a and 101b.

The sealing member (101a, 101b) having such concave portion (102a, 102b) and such collar portion (103a, 103b) may be prepared by subjecting a given metallic material to deep drawing or press working. In this case, work hardening is occurred, whereby the resulting sealing member becomes to have a satisfactory physical strength even when the thickness thereof is relatively thin. This provides an advantage in that because the collar portions 103a and 103b respectively provided outside the space formed by the concave portions 102a and 102b in the battery main body is accommodated are mutually welded to establish the armor vessel as above described, there is no occasion for heat generated upon the welding of the collar portions 103a and 103b to be directly diffused into said space, where the collar portions 103a and 103b function to radiate said heat. This situation makes it unnecessary to provide such heat shielding member (1106) required in the conventional thin type rechargeable lithium battery (see, FIG. 11).

The peripheral collar portion (103a, 103b) is desired to have a width preferably in a range of from 0.5 mm to 3.0 mm or more preferably in a range of from 0.5 mm to 2.0 mm. This range for the width of the peripheral collar portion (103a, 103b) has been established as a result of experimental studies by the present inventors aiming at preventing the battery main body from having a thermal influence upon the welding.

The welding of the peripheral collar portions 103a and 103b may be conducted by means of laser beam welding, electron beam welding, resistance welding, or ultrasonic welding. Of these, laser beam welding is the most appropriate in viewpoints of productivity and reliability.

The laser beam irradiation diameter upon the laser beam welding is different depending upon the kind of a material constituting the sealing member (101a, 101b) or the thickness of the sealing member (101a, 101b). For instance, in the case where the sealing member (101a, 101b) is constituted by a stainless steel, it is preferred to be in a range of from 0.2 mm to 0.4 mm. In the case where the sealing member (101a, 101b) is constituted by an aluminum, it is desired to be in a range of from 0.6 mm to 0.8 mm.

In the following, description in more detail will be made of the armor vessel of the rechargeable lithium battery shown in FIG. 1 with reference to FIG. 2.

Figure 2:
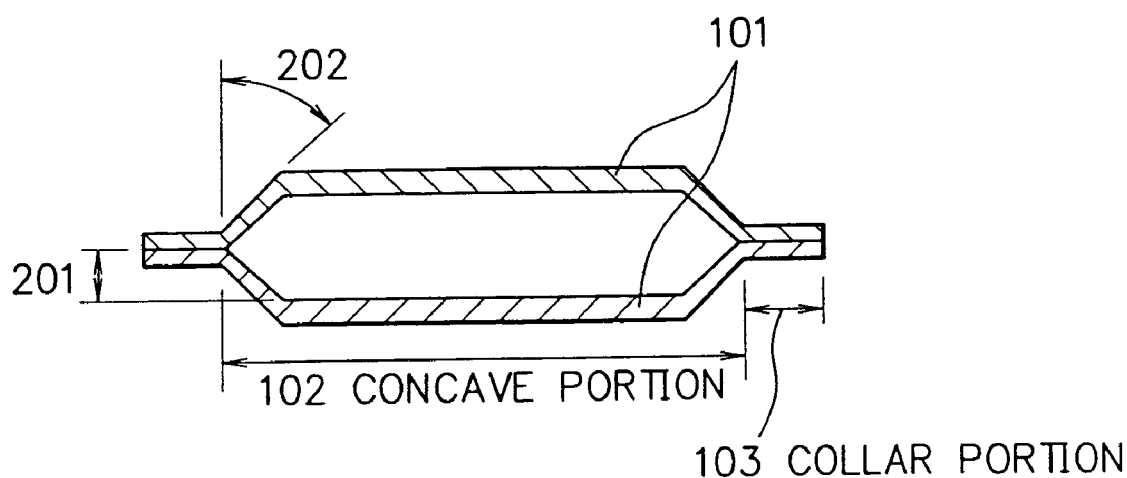
FIG. 2 is a schematic cross-sectional view taken along the line X-X' in FIG. 1, which illustrates an example of an armor member constituting the rechargeable lithium battery shown in FIG. 1.

FIG. 2 is a schematic cross-sectional view taken along the line X-X' in FIG. 1, which illustrates the armor vessel (comprising the sealing member 101a and the sealing member 101b) constituting the rechargeable lithium battery shown in FIG. 1. In FIG. 2, the components of the battery main body are omitted.

In FIG. 2, reference numeral 101 indicates the sealing member (101a, 101b) in FIG. 1, reference numeral 102 indicates the concave portion (102a, 102b) in FIG. 1, and reference numeral 103 indicates the peripheral collar portion (103a, 103b) in FIG. 1.

It is preferred for the concave portion 102 [that is, the concave portion (102a, 102b) in FIG. 1] to be shaped to have a cross section in a substantially symmetrical trapezoidal form. The symmetrical trapezoidal form as the concave portion 102 has a desired depth 201. The symmetrical trapezoidal form as the concave portion 102 is preferred to have an inclination 202 in a range of from 5° to 45°.

However, the concave portion 102 may be of a cross section in an unsymmetrical trapezoidal form.

For the depth 201 of the concave portion 102 in the symmetrical trapezoidal form of the sealing member 101 [that is, the sealing member (101a, 101b) in FIG. 1], it is not strictly defined. However, in general, it is preferably in a range of from 0.3 mm to 3 mm or more preferably in a range of from 0.5 mm to 2.5 mm. This range for the depth 201 of the concave portion 102 has been established as a result of experimental studies by the present inventors. Particularly, in the case where the depth 201 is made to be less than 0.3 mm, the thickness of the sealing member 101 becomes to be relatively excessively thick, where the space for the battery main body to be accommodated becomes small accordingly. Thus, the depth 201 is necessary to be 0.3 mm or more. To make the depth 201 to be beyond 3 mm is not suitable for attaining the object of the present invention to provide a thin type rechargeable lithium battery.

For the constituent of the sealing member 101 [that is, the sealing member (101a, 101b) in FIG. 1], a stainless steel having a large physical strength is preferred in the case where the sealing member 101 is required to be relatively thinned. An aluminum material is preferred in the case where the sealing member 101 is required to be relatively lightened. Besides, it is possible to use other metallic materials such as a nickel material, a nickel-plated iron material, a copper material, and the like.

For the thickness of the sealing member 101 [that is, the sealing member (101a, 101b) in FIG. 1], it is preferred to be in a range of from 0.05 to a thickness for which press working can be conducted. For the upper limit of the thickness of the sealing member 101, it is 0.3 mm in the case where the sealing member 101 is constituted by a stainless steel material, and it is 0.8 mm in the case where the sealing member 101 is constituted by an aluminum material. Specifically, in a preferred embodiment, the thickness of the sealing member 101 is in a range of from 0.1 mm to 0.2 mm in the case where the sealing member 101 is constituted by a stainless steel material. And in the case where the sealing member 101 is constituted by an aluminum material, the thickness of the sealing member is in a range of from 0.2 mm to 0.5 mm.

Separately, depending upon the situation involved, it is possible for the sealing member 101 to be constituted by a plastic material. However, in practice, it is difficult to constitute the entirety of the sealing member 101 by a plastic material because the plastic material does not have a satisfactory physical strength required for the sealing member.

Figure 3:
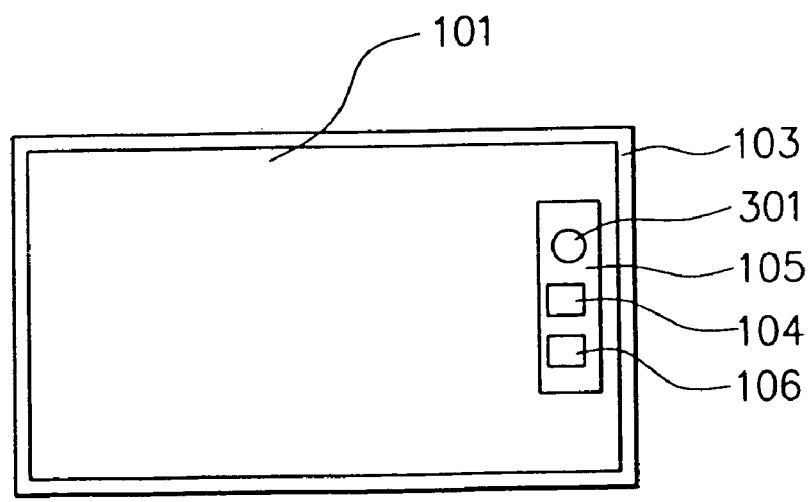
FIG. 3 is a schematic plan view of the rechargeable lithium battery shown in FIG. 1 when viewed from above, which illustrates the configuration of a top face of said rechargeable lithium battery in which an inner pressure release vent is additionally provided.

A plastic material may be used in such configuration as shown in FIG. 3 of the rechargeable lithium battery of the present invention. FIG. 3 is a schematic plan view of the rechargeable lithium battery shown in FIG. 1 when viewed from above, which illustrates the configuration of a top face of said rechargeable lithium battery in which an inner pressure release vent is additionally provided.

In FIG. 3, reference numeral 101 indicates the sealing member (101a) in FIG. 1, and reference numeral 103 indicates the peripheral collar portion (103a) in FIG. 1. Reference numeral 104 indicates the cathode power output terminal (104) in FIG. 1, reference numeral 105 indicates the insulating portion (105) in FIG. 1, and reference numeral 106 indicates the anode power output terminal (106) in FIG. 1. Reference numeral 301 indicates an inner pressure release vent which serves to release the inner pressure in the inside of the armor vessel (the battery vessel) when said inner pressure is increased. As shown in FIG. 3, on the outer surface of the sealing member 101 of the rechargeable lithium battery, there are provided the anode power output terminal 106, the cathode power output terminal 104, and the inner pressure release vent 301 through the insulating portion 105, where the insulating portion 105 may be constituted by a plastic material, and the inner pressure release vent 301 may be also constituted by a plastic material.

Figure 4:
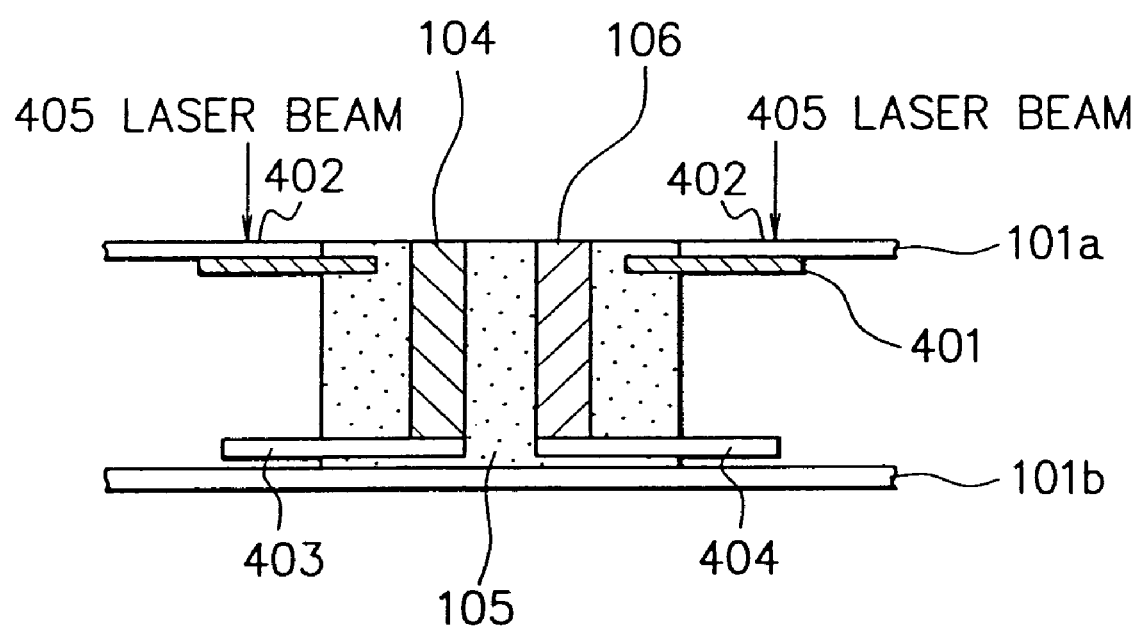
FIG. 4 is a schematic cross-sectional view taken along the line Y-Y' in FIG. 1, which illustrates an example of the internal constitution of the rechargeable lithium battery shown in FIG. 1.

FIG. 4 is a schematic cross-sectional view taken along the line Y-Y' in FIG. 1, which illustrates an example of the internal constitution of the rechargeable lithium battery shown in FIG. 1. In FIG. 4, reference numeral 101a indicates the sealing member (101a) in FIG. 1, reference numeral 101b indicates the sealing member (101b) in FIG. 1, reference numeral 104 indicates the cathode power output terminal (104) in FIG. 1, reference numeral 105 indicates the insulating portion (105) in FIG. 1, and reference numeral 106 indicates the anode power output terminal (106) in FIG. 1. Each of reference numerals 401 and 402 indicates an support metal plate inserted in the insulating portion 105 such that the support metal plate is fixed to the insulating portion. Each of the support metal plates 401 and 402 is fixed to the sealing member 101a by means of laser beam welding 405. Reference numeral 403 indicates a terminal lead connected to the cathode power output terminal 104, and reference numeral 404 indicates a terminal lead connected to the anode power output terminal 106, where each of the terminal leads 403 and 404 is electrically isolated from the sealing member 101b through the insulating portion 105. Similarly, the cathode power output terminal 104 and the anode power output terminal 106 are also electrically isolated from the sealing member 101a through the insulating portion 105.

In this constitution shown in FIG. 4, the insulating portion may be constituted by a plastic material.

Figure 5:
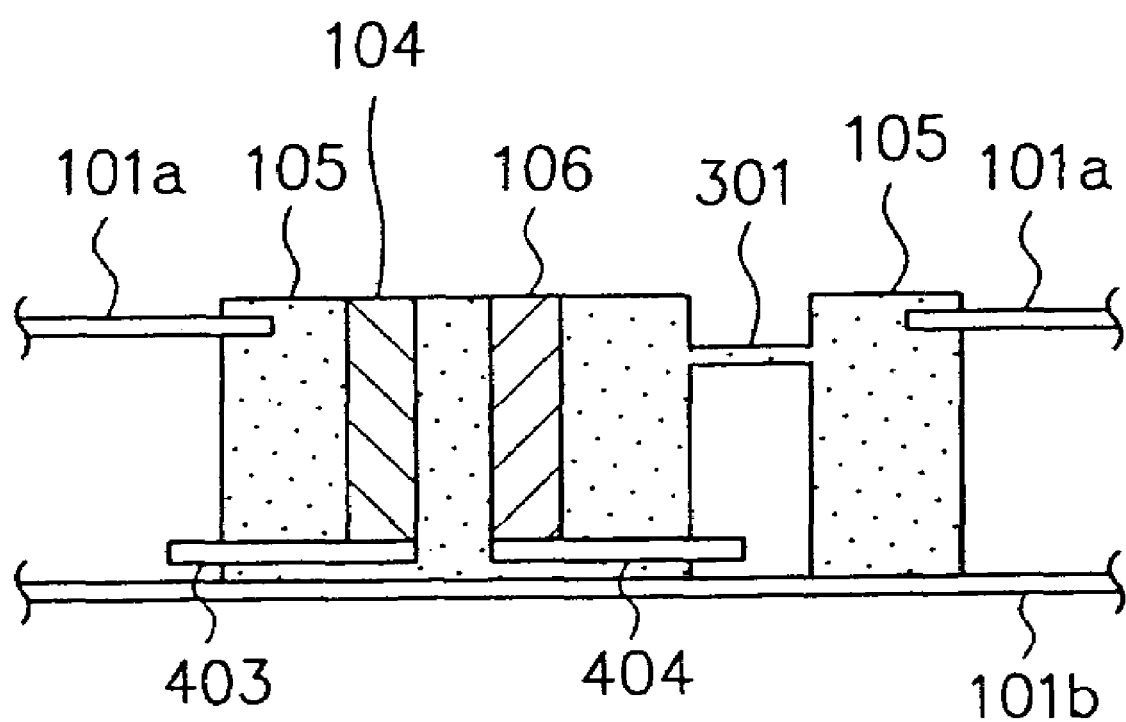
FIG. 5 is a schematic cross-sectional view taken along the line Y-Y' in FIG. 1, which illustrates another example of the internal constitution of the rechargeable lithium battery shown in FIG. 1 in which an inner pressure release vent is additionally provided.

FIG. 5 is a schematic cross-sectional view taken along the line Y-Y' in FIG. 1, which illustrates another example of the internal constitution of the rechargeable lithium battery shown in FIG 1. The constitution shown in FIG. 5 is the same as that shown in FIG. 4, except for the following points. That is, in the constitution shown in FIG. 5, such support metal plate (401) used in FIG. 4 is not used, the insulating portion 105 is directly fixed to the sealing member 101a by partially inserting the sealing member 101a in the insulating portion 105, and an internal pressure release vent 301 is provided at the insulating portion 105. The internal pressure release vent 301 serves to release the internal pressure of the rechargeable lithium battery when said internal pressure is undesirably increased. In this embodiment, the internal pressure release vent 301 comprises a plug comprising a thin film formed of a plastic material which is the same as the constituent of the insulating portion 105.

In the constitution shown in FIG. 5, the sealing members 101a and 101b, the cathode power output terminal 104 having the terminal lead 403, the anode power output terminal 106 having the terminal lead 404, and the insulating portion 105 having the internal pressure release vent 301 may be integrally formed.

The internal pressure release vent 301 is not limited only to aforesaid embodiment. The plug comprising the plastic material as the internal pressure release vent 301 may be a metal thin foil fixed to the insulating portion 105 so that said metal thin foil can be automatically broken to release the inner pressure of the rechargeable lithium battery when said inner pressure is increased to reach a given pressure. Alternatively, it is possible to form a thin metal film portion at the sealing member 101a by way of press working so that said thin metal film portion can function as the internal pressure release vent 301. Besides, the internal pressure release vent 301 may comprise a rubber plug (in a spherical form or a trapezoidal form) or a spring which actuates to release the inner pressure of the rechargeable lithium battery when said inner pressure is increased to reach a given pressure.

Figure 6:
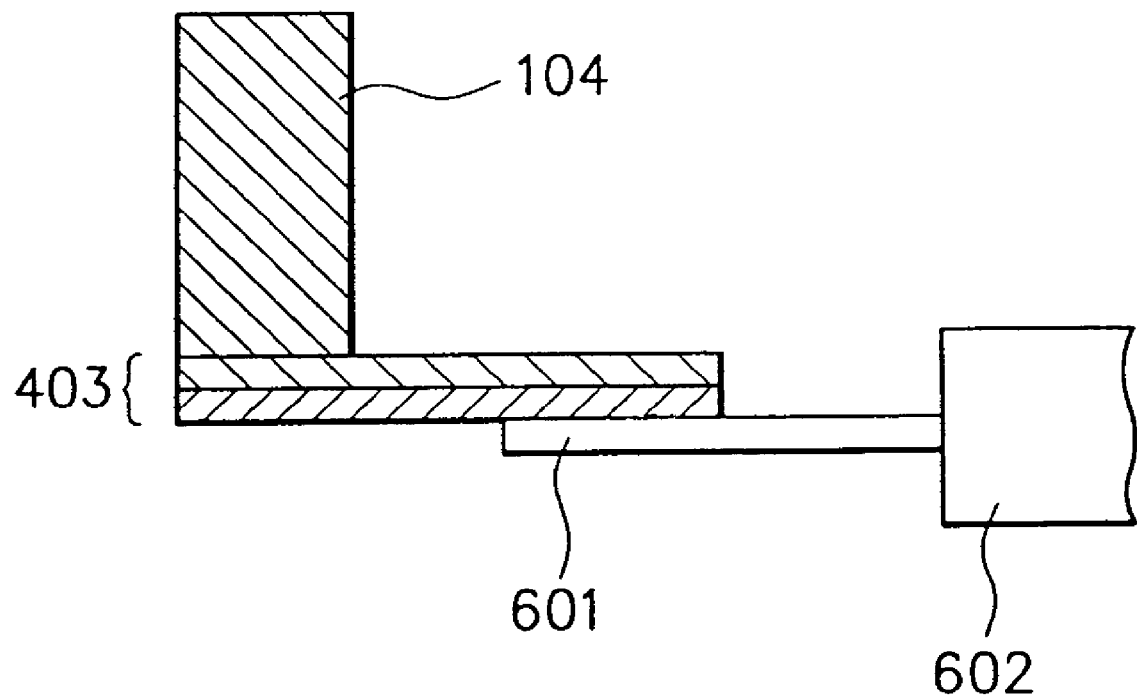
FIG. 6 is a schematic explanatory view of an embodiment in that a clad member is used when a cathode power output terminal and a cathode lead portion (extending from a cathode) are electrically connected through a cathode power output terminal lead in a rechargeable lithium battery of the present invention.

FIG. 6 is a schematic explanatory view of an embodiment in that a clad member is used when a cathode power output terminal and a cathode lead portion (extending from a cathode) are electrically connected through a cathode power output terminal lead in a rechargeable lithium battery of the present invention. In FIG. 6, reference numeral 104 indicates a cathode power output terminal (104) [see, FIG. 1, FIG. 4, or FIG. 5], and reference numeral 403 indicates a cathode power output terminal lead (403) [see, FIG. 4 or FIG. 5]. Reference numeral 601 indicates a cathode lead portion extending from a cathode 602 of a battery main body (not shown) provided in a rechargeable lithium battery (not shown) having such configuration as shown in FIG. 1.

The cathode power output terminal 104 is preferred to comprises a highly electrically conductive metallic material which is hardly corroded and has a satisfactory physical strength. Such metallic material can include a metal member made of Cu or Ni, and a member comprising said metal member which is plated with Au. When the cathode power output terminal lead 403 which is integrally formed with the cathode lead portion 601 extending from the cathode 602 is constituted by a single metallic material, there will be such disadvantages as will be described in the following. In the case where both the cathode lead portion 601 and the cathode power output terminal lead 403 are constituted by an aluminum material, although they can be readily welded with each other, it is difficult to secure a satisfactory physical strength for the cathode power output terminal lead 403 which is integrated with the cathode lead portion 601. In the case where the cathode power output terminal lead 403 is constituted by a nickel material having a satisfactory physical strength and the cathode lead portion 601 is constituted by an aluminum material, it is difficult for the cathode power output terminal lead 403 and the cathode lead portion 601 to be welded so that the integrated portion between them is always maintained without being peeled. In order to eliminate these disadvantages, it is preferred that the cathode power output terminal lead 403 is constituted a clad member comprising a composite which comprises two or more kinds of metal or alloy materials. This situation is similar also with respect to the anode.

Figure 7:
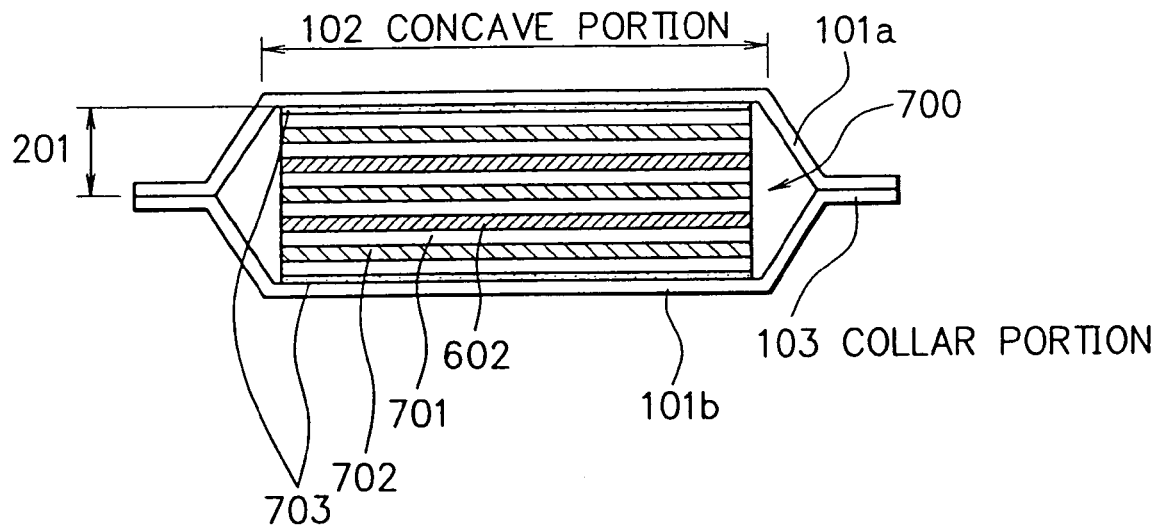
FIG. 7 is a schematic cross-sectional view taken along the line X-X' in FIG. 1, which illustrates an example of a battery main body accommodated in the rechargeable lithium battery shown in FIG. 1.

FIG. 7 is a schematic cross-sectional view taken along the line X-X' in FIG. 1, which illustrates an example of a battery main body accommodated in the rechargeable lithium battery shown in FIG. 1. In FIG. 7, reference numeral 700 indicates a battery main body accommodated in the armor vessel (the battery vessel) formed by mating the two sealing members 101a and 101b each having the concave portion 102 (having a cross section in a symmetrical trapezoidal form with a depth 201) and the peripheral collar portion 103 such that the two symmetrical trapezoidal form spaces of the two concave portions 102 are faced to oppose to each other and welding the two peripheral collar portion 103 with each other. The battery main body 700 comprises a stacked body formed by winding an anode 702 and a cathode 602 (see, FIG. 6) through an isolator 701 (comprising an ion conductor comprising an electrolyte or a separator impregnated with an electrolyte solution) about a given axis and an insulating film 703 which covers said stacked body.

In the following, description will be made of each constituent of the battery main body 700 shown in FIG. 7.

Cathode 602:

The cathode 602 comprises at least a cathode active material and a cathode collector. The cathode active material may comprise a material capable of taking lithium therein and releasing said lithium and which is insoluble in and stable against an electrolyte solution used in the rechargeable lithium battery. Such material as the cathode active material can include lithium-containing transition metal oxides such as $LiCoO_2$, $LiNiO_2$, $LiMnO_2$, and $LiMn_2O_4$; metal oxides containing no lithium such as $V_2O_5$, $MnO_2$, $TiO_2$, and $MoO_3$; and metal chalcogen compounds such as $TiS_2$, and $MoS_2$. Besides, electrically conductive polymers such as polyacetylene, polypyrrole, polyaniline, and polyphthalocyanine, and derivatives of these polymers are also usable.

The cathode 602 may be prepared by forming a cathode active material layer on a collector using such cathode active material, if necessary by adding an appropriate electrically conductive auxiliary or/and an appropriate binder. The cathode active material layer may be formed on either one side or opposite sides of the collector.

The collector used in the cathode serves to efficiently supply an electric current consumed in or collect an electric current generated in the electrode reaction upon charging or discharging. In this connection, the collector is constituted by a material which is highly electrically conductive and inactive in the battery reaction.

Such material to constitute the collector of the cathode can include metals such as Al, Ti, and Ni, and alloys of these metals such as stainless steels. The collector may be shaped in a sheet form, mesh form, porous form-like sponge, expanded metal form, or punched metal form.

The electrically conductive auxiliary which is used if required upon the formation of the cathode can include electrically conductive materials which are highly electrically conductive and are insoluble in and stable against an electrolyte solution used in the rechargeable lithium battery. Specific examples of such electrically conductive material are carbonous materials such as powdery graphite structure carbon, and the like, and powdery metallic materials such as copper powder, aluminum powder, titanium powder, and the like.

As the binder which is used if required upon the formation of the cathode, it is preferred to use an organic polymer which has adhesive properties and which is insoluble in and stable against an electrolyte solution used in the rechargeable lithium battery. As specific preferable examples of such organic polymer, there can be mentioned fluororesins such as poly(vinylidene fluoride), tetrafluoroethylene polymer, and the like. Besides, celluloses such as methyl cellulose and carboxymethyl cellulose, and polyvinyl series materials such as polyvinyl alcohol, and the like are also usable.

Anode 702:

The anode 702 comprises at least an anode active material and an anode collector. The anode active material may comprise a material capable of taking lithium therein and releasing said lithium and which is insoluble in and stable against an electrolyte solution used in the rechargeable lithium battery. Such material as the anode active material can include a lithium metal, and lithium-containing alloys such as Al—Li alloy, Pb—Li alloy, Sn—Li alloy, and the like. Besides, metal oxides such as $TiO_2$ and $V_2O_5$; lithium compounds of these oxides; alloys comprising a metal (Sn or Si) capable of alloying with lithium and a metal (Fe, Co, or Ni) incapable of alloying with lithium such as Sn—Fe alloy, Sn—Co alloy, Si—Fe alloy, and Si—Ni alloy; and carbonous materials such as amorphous carbon and graphite.

The anode 702 may be prepared by forming an anode active material layer on a collector using such anode active material, if necessary by adding an appropriate electrically conductive auxiliary or/and an appropriate binder. The anode active material layer may be formed on either one side or opposite sides of the collector.

The collector used in the anode serves to efficiently supply an electric current consumed in or collect an electric current generated in the electrode reaction upon charging or discharging. In this connection, the collector is constituted by a material which is not alloyed with lithium and which is highly electrically conductive and inactive in the battery reaction.

Such material to constitute the collector of the anode can include metals such as Cu, Ni, and Ti, and alloys of these metals such as stainless steels. The collector may be shaped in a sheet form, mesh form, porous form-like sponge, expanded metal form, or punched metal form.

The electrically conductive auxiliary which is used if required upon the formation of the anode can include electrically conductive materials which are highly electrically conductive and are insoluble in and stable against an electrolyte solution used in the rechargeable lithium battery. Specific examples of such electrically conductive material are carbonous materials such as powdery graphite structure carbon, and the like, and powdery metallic materials such as copper powder, aluminum powder, titanium powder, and the like.

As the binder which is used if required upon the formation of the anode, it is preferred to use an organic polymer which has adhesive properties and which is insoluble in and stable against an electrolyte solution used in the rechargeable lithium battery. As specific preferable examples of such organic polymer, there can be mentioned fluororesins such as poly(vinylidene fluoride), tetrafluoroethylene polymer, and the like. Besides, celluloses such as methyl cellulose and carboxymethyl cellulose, and polyvinyl series materials such as polyvinyl alcohol, and the like are also usable.

Isolator 701:

The isolator 701 is provided in order to electrically isolating between the cathode 602 and the anode 702, where it is required for the isolator to allow lithium ion to freely pass therethrough. As the isolator 701, it is possible to use a separator having an electrolyte solution (a supporting electrolyte solution) obtained by dissolving a given electrolyte (a given supporting electrolyte) in an adequate solvent retained therein. In this case, the separator functions as an ion conductor.

Besides, the isolator 701 may comprise an ion conductor comprising a solid electrolyte or a solidified electrolyte. In this case, it is possible for said solid electrolyte or said solidified electrolyte to be retained by a separator.

In the case where the separator is used, the separator is necessary to have a structure having a number of perforations capable of allowing ions of the electrolyte to pass therethrough and it is also necessary to be insoluble in and stable to the electrolyte solution.

Therefore, the separator is necessary to comprise a member which satisfies these requirements. As such member, there can be mentioned, for example, nonwoven fabrics or membranes having a micropore structure, made of polyolefin such as polypropylene, polyethylene or the like. Besides, composite members comprising two or more these members having a plurality of micropores are also usable.

The electrolyte solution comprises a given electrolyte dissolved in a given solvent. The electrolyte can include lithium hexafluorophosphate, lithium tetrafluorophosphate, and lithium tetrafluoroborate. The solvent can include propylene carbonate, ethylene carbonate, diethyl carbonate, methylethyl carbonate, and γ-butyrolactone.

The solidified electrolyte can include those obtained by providing an electrolyte solution obtained by dissolving any of aforesaid electrolytes in any of aforesaid solvents and gelling said electrolyte solution by a gelling agent to solidify the electrolyte solution. As the gelling agent, there can be used a polymer selected from a group consisting of polyethylene oxide, polyacrylonitrile, and polyethylene-imine.

The solid electrolyte can include β-alumina, silver oxide, and lithium iodide.

For the arrangement of the cathode, the anode and the ion conductor (comprising the separator (which is eventually impregnated with the electrolyte solution), the solid electrolyte, the solidified electrolyte, or a combination of the separator (not impregnated with the electrolyte solution) and the solid electrolyte or the solidified electrolyte) in the preparation of a battery main body, there can be adopted a configuration in that the cathode and the anode are alternately stacked through the ion conductor or a configuration in that the cathode and the anode are wound through the ion conductor separator in a flat form. In the case where the ion conductor comprising the separator (which is eventually impregnated with the electrolyte solution) is used, a wound configuration in a flat form is desirable. In the case where the ion conductor comprising the solid electrolyte or the solidified electrolyte is used, a stacked configuration is desirable.

Insulating Film 703:

The insulating film 703 which covers the battery main body 700 is desired to comprise an insulating organic material which is resistant to solvents. Such organic material can include polypropylene, polyethylene, polyethylene terephthalate, polyimide, and fluororesin.

The insulating film 703 is preferred to have a thickness in a range of from 10 μm to 50 μm.

Figure 8:
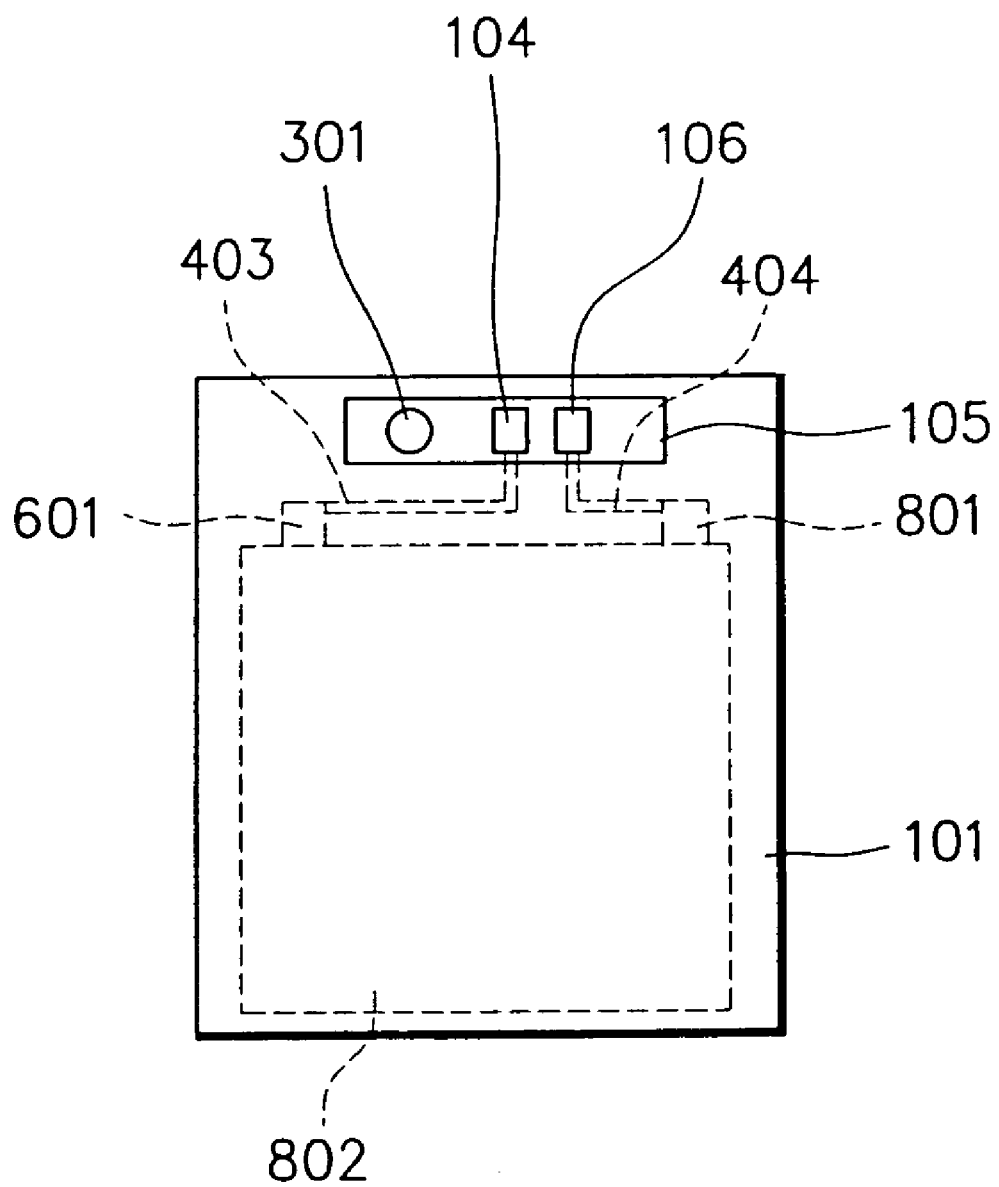
FIG. 8 is a schematic plane view of a rechargeable lithium battery of the present invention having a battery main body having such configuration as shown in FIG. 7 when viewed from above, which illustrates the configuration of a top face of said rechargeable lithium battery.

FIG. 8 is a schematic plane view of a rechargeable lithium battery of the present invention having a battery main body having such configuration as shown in FIG. 7 when viewed from above, which illustrates the configuration of a top face of said rechargeable lithium battery.

In FIG. 8, reference numeral 101 indicates an upper sealing member (which is corresponding to the sealing member 101a in FIG. 7). Reference numeral 802 indicates a battery main body (which is corresponding to the battery main body 700 in FIG. 7). Reference numeral 601 indicates a cathode lead portion (which is corresponding to the cathode lead portion 601 in FIG. 6) which is extending from the cathode of the battery main body 802. Reference numeral 801 indicates an anode lead portion extending from the anode of the battery main body 802. Reference numeral 105 indicates an insulating portion (see, FIG. 4 or FIG. 5) through which an inner pressure release vent 301, a cathode power output terminal 104, and an anode power output terminal 106 are provided. The cathode lead portion 601 is electrically connected to the cathode power output terminal 104 through a cathode power output terminal lead 403, and the anode lead portion 801 is electrically connected to the anode power output terminal 106 through an anode power output terminal lead 404.

The insulating portion 105 comprises an insulating plastic material having a satisfactory physical strength and which excels in resistance to solvents and does not allow moisture to pass therethrough. Specific examples of such plastic material are polyethylene, polypropylene, polyethylene terephthalate, and fluororesin.

As previously described, the inner pressure release vent 301 may be formed upon integrally forming the insulating portion 105 with the cathode power output terminal 104 and the anode power output terminal 106.

Now, when the battery main body 802 [comprising the cathode, the anode, the isolator (containing the ion conductor)] is accommodated in the sealing member 101 constituting the battery vessel (the armor vessel), it is necessary for the battery main body 802 to be insulated from the sealing member 101 so that the battery main body 802 is not directly contacted with the sealing member 101. This purpose can be attained by a method of previously covering the battery main body 802 by an insulating film made of polyimide, polyethylene terephthalate, polypropylene, or polyethylene; a method of previously lining the inside face of the sealing member 101 by an insulating plastic film; or a method of previously coating the inside face of the sealing member 101 by an insulating plastic material.

A rechargeable lithium battery constituted as above described may be produced, for instance, in the following manner. For instance, such configuration as shown in FIG. 4 in that the cathode power output terminal 104 and the anode power output terminal 106 are embedded in the insulating portion 105 is first established at a prescribed position in the concave portion 102 (having a cross section in a symmetrical trapezoidal form with a depth 201) of the upper sealing member 101 (corresponding to the sealing member 101a in FIG. 7). Then, the battery main body 802 covered by an insulating plastic film is arranged in said concave portion 102, where the cathode lead portion 601 of the battery main body 802 is connected with the cathode power output terminal 104 by way of laser beam welding, resistance welding, or ultrasonic welding, and the anode lead portion 801 of the battery main body 802 is also connected with the anode power output terminal 106 by way of laser beam welding, resistance welding, or ultrasonic welding. Then, the lower sealing member 101b having the concave portion 102 (having a cross section in a symmetrical trapezoidal form with a depth 201) is mated with the upper sealing member 101a so that the symmetrical trapezoidal form space of the concave portion 102 of the sealing member 101 b and the symmetrical trapezoidal form space (having the battery main body 802 arranged therein) of the concave portion 102 of the sealing member 101a are opposed to each other. And the two peripheral collar portions 103 (see, FIG. 7) of the two sealing members 101a and 101b which are mated are mutually welded. By this, there is obtained a thin type rechargeable lithium battery.

Incidentally, there is considered a manner of conducting the joining of the two peripheral collar portions 103 in the above using an adhesive. Particularly, in the case where the rechargeable lithium battery is used under environmental condition which is maintained at about normal temperature, it is possible that the joining of the two peripheral collar portions 103 in the production of the rechargeable lithium battery is conducted using an appropriate adhesive. However, in the case where the rechargeable lithium battery is used under environmental condition with low temperature or high temperature, the joining of the two peripheral collar portions 103 using an adhesive is not suitable for the reason that because the expansion coefficient of the adhesive is different from that of the peripheral collar portions, there is a tendency in that the adhesion between the adhesive and the peripheral collar portions is decreased to allow moisture invasion into the inside of the battery, resulting in deteriorating the battery performance.

On the other hand, in the case where the two peripheral collar portions 103 are joined by welding them by way of laser beam welding, the portions to be mutually joined of the two peripheral collar portions are fused and joined in a uniform state. In this connection, the resulting rechargeable lithium battery has a tightly sealed structure which sufficiently endures against environmental changes including temperature changes to a large extent and has an improved durability and an improved reliability.

Figure 9:
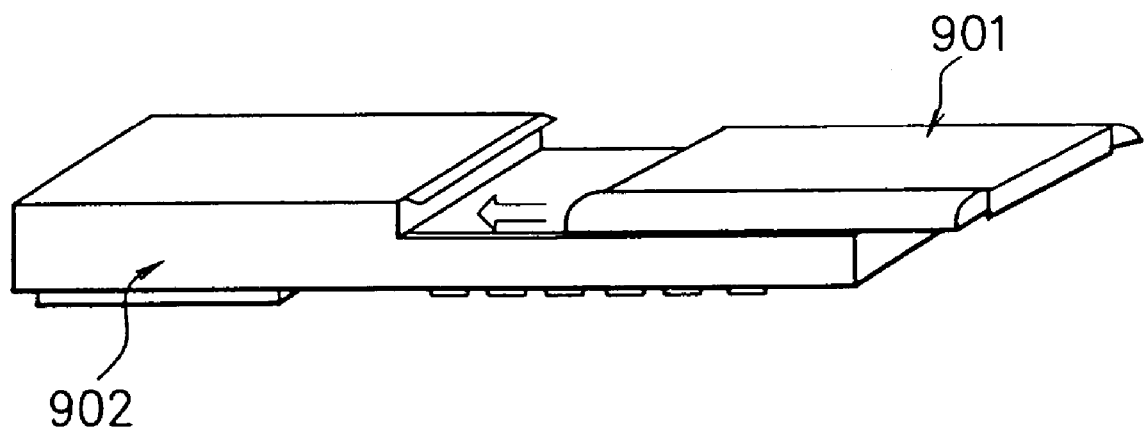
FIG. 9 is a schematic view illustrating an example of a cellular phone in which a rechargeable lithium battery of the present invention is provided.
Figure 10A:
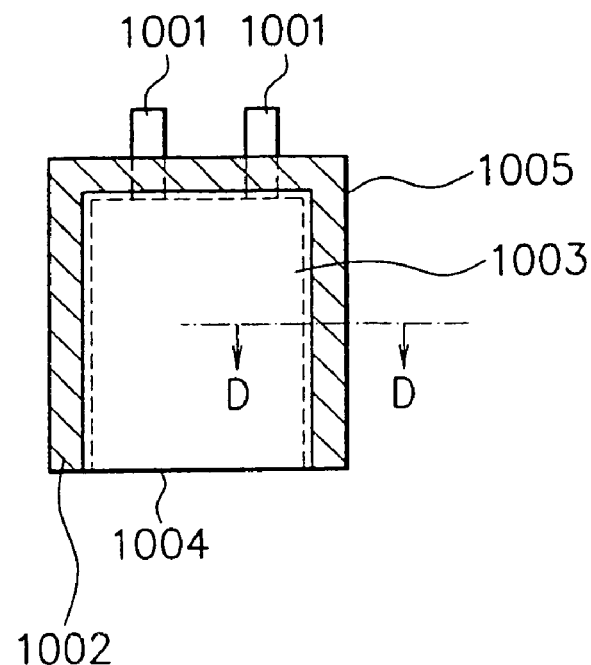
FIGS. 10(*a*) and 10(*b*) are schematic cross-sectional views illustrating an example of a conventional rechargeable lithium battery having an armor comprising a laminate film.
Figure 10B:
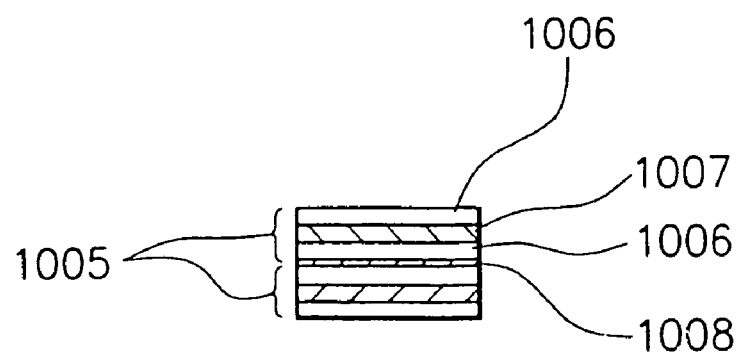

FIG. 9 is a schematic view illustrating an example when a rechargeable lithium battery of the present invention is practically used as a power source in a cellular phone. In FIG. 9, reference numeral 901 indicates a rechargeable lithium battery of the present invention, and reference numeral 902 a cellular phone. As shown in FIG. 9, the rechargeable lithium battery 901 is set to the cellular phone 902 so that the outside of the sealing member of the rechargeable lithium battery 901 constitutes part of the armor of the cellular phone 902. In this case, in order for the outside of the rechargeable lithium battery 901 to be matched with the armor of the cellular phone 902 so that an exterior difference is not present between them, it is desired that an appropriate plastic material or a label is affixed to or coating is applied to the exterior of the rechargeable lithium battery. The rechargeable lithium battery of the present invention can be used as it is without conducting a reinforcing treatment for the armor thereof because it has a sufficient physical strength. On the other hand, in the case where a conventional rechargeable battery whose armor comprising a laminate film is installed in the cellular phone, because the armor comprising the laminate film is inferior in the physical strength, it is necessary to conduct a reinforcing treatment for the armor.

In the following, the present invention will be described in more detail with reference to examples. It should be understood that these examples are only for illustrative purposes and that the scope of the present invention is not restricted to these examples.

EXAMPLE 1

In this example, there was prepared a thin type rechargeable lithium battery having such configuration as shown in FIGS. 1 to 4 in the following manner.

1. Preparation of Cathode:

90 parts by weight of $LiCoO_2$ as a cathode active material, 5 parts by weight of natural graphite as an electrically conductive auxiliary, and 5 parts by weight of polyvinylidene fluoride as a binder were mixed to obtain a mixture. The mixture was mixed with 50 parts by weight of N-methyl-2-pyrrolidone as a solvent to obtain a paste having a viscosity of 3000 cps. The paste was applied onto opposite sides of an aluminum foil having a thickness of 20 µm as a collector, followed by subjecting to drying thereby to form a coat layer on each of the opposite sides of the aluminum foil.

The resultant obtained in the above was subjected to pressing to obtain an element having a thickness of 200 µm which comprises the aluminum foil sandwiched between the two layers each as a cathode active material layer. The element thus obtained was cut to obtain six cathodes having a size of 52 mm×70 mm which are used in the formation of six cell units each comprising a separator sandwiched between a cathode and an anode upon the preparation of a battery main body, which will be described later.

2. Preparation of Anode:

95 parts by weight of graphite as an anode active material and 5 parts by weight of polyvinylidene fluoride as a binder were mixed to obtain a mixture. The mixture was mixed with 60 parts by weight of N-methyl-2-pyrrolidone as a solvent to obtain a paste having a viscosity of 2000 cps. The paste was applied onto opposite sides of a copper foil having a thickness of 12 µm as a collector, followed by subjecting to drying thereby to form a coat layer on each of the opposite sides of the aluminum foil.

The resultant obtained in the above was subjected to pressing to obtain an element having a thickness of 180 µm which comprises the copper foil sandwiched between the two layers each as an anode active material layer. The element thus obtained was cut to obtain seven anodes having a size of 52 mm×70 mm which are used in the formation of six cell units each comprising a separator sandwiched between a cathode and an anode upon the preparation of a battery main body, which will be described later.

3. Preparation of Battery Main Body:

(1). For each of the six cathodes obtained in the above step 1, a partial portion of each of the two cathode active material layers was removed to expose the collector (the aluminum foil), and an aluminum ribbon having a width of 5 mm, a thickness of 50 µm, and a length of 5 mm as a cathode lead was welded to the exposed portion of the collector.

(2). For each of the seven anodes obtained in the above step 2, a partial portion of each of the two anode active material layers was removed to expose the collector (the copper foil), and a copper ribbon having a width of 5 mm, a thickness of 50 µm, and a length of 5 mm as an anode lead was welded to the exposed portion of the collector.

(3). The seven anodes obtained in the above (2) and the six cathodes obtained in the above (1) were alternately stacked through a separator comprising a 25 µm polyethylene porous film having a number of micropores and having a size of 53 mm×71 mm each time so that the anode was situated on either outermost side, whereby a stacked battery main body was obtained. And a 25 µm thick polypropylene film having a size of 53 mm×71 mm as an insulating film was fixed to each of the opposite outer sides of the battery main body in order to insulating the battery main body from a battery vessel (an armor vessel) in which the battery main body is accommodated.

4. Preparation of Sealing Members:

There were prepared two sealing members (101a and 101b, see FIG. 1) each having such cross section pattern as shown in FIG. 2 by processing a stainless steel plate having a thickness of 0.15 mm by way of deep drawing using a die. Particularly, there were prepared a rectangular pan-like shaped sealing member (a) and a rectangular pan-like shaped sealing member (b) each having a concave portion shaped to have a cross section in a substantially symmetrical trapezoidal form and a flat peripheral collar portion surrounding said concave portion, said concave portion having a rectangular bottom having a longitudinal length of 85.2 mm and a lateral length of 53.2 mm and a rectangular open top having a longitudinal length of 86 mm and a lateral length of 54 mm, said flat peripheral collar portion having a width of 2 mm, said symmetrical trapezoidal form as said concave portion having a depth (the vertical length of the symmetrical trapezoidal form) of 1.65 mm, and said symmetrical trapezoidal form as said concave portion having an inclination (202, see FIG. 2) of 15°. The peripheral collar portion of the sealing member (a) will be hereinafter referred to as "peripheral collar portion (a-i)", and the peripheral collar portion of the sealing member (b) will be hereinafter referred to as "peripheral collar portion (b-i)".

5. Fabrication of Rechargeable Battery:

(1). For the sealing member (a) obtained in the above step 4, an opening of a size of 12 mm×10 mm was formed at a prescribed end portion of the concave portion. In the space established in the concave portion of the sealing member (a) by said opening, using a jig having a die, a fused polypropylene material was introduced and a 150 µm thick nickel sheet (i) as a cathode power output terminal and a 150 µm thick nickel sheet (ii) as an anode power output terminal were separately inserted in said fused polypropylene material, followed by being cooled. By this, in the space established in the concave portion of the sealing member (a) by the opening, there was formed an insulating portion (comprising the polypropylene material) having the cathode power output terminal [comprising the nickel sheet (i)] and the anode power output terminal [comprising the nickel sheet (ii)] spacedly arranged such that their end portions are separately exposed to the outside from the upper face of the insulating portion which is situated in the opening of the concave portion and the remaining their end portions are also exposed to the outside from the lower side face of the insulating portion which is situated in the inside of the concave portion. Here, the cathode power output terminal and the anode power output terminal including their exposed end portions are electrically isolated from the sealing member (a) by the insulating portion.

(2). The battery main body obtained in the above step 3 was arranged in the remaining space of the concave portion of the sealing member (a), where the cathode leads (comprising the aluminum ribbon) of the battery main body were together fixed to the cathode power output terminal exposed from the lower side face of the insulating portion by way of ultrasonic welding, and the anode leads (comprising the copper ribbon) of the battery main body were together fixed to the anode power output terminal exposed from the lower side face of the insulating portion by way of ultrasonic welding. Then, an electrolyte solution obtained by dissolving 1 M (mol/liter) of lithium hexafluorophosphate dissolved in 1 liter of a mixed solvent obtained by mixing propylene carbonate and dimethyl carbonate at an equivalent mixing ratio was introduced in the battery main body to impregnate the separators of the battery main body with the electrolyte solution.

Thereafter, the sealing member (b) was mated with the sealing member (a) such that the symmetrical form concave portion of the sealing member (b) and the symmetrical form concave portion (having the battery main body and the insulating portion therein ) of the sealing member (a) were matched to oppose to each other to obtained a battery vessel comprising the sealing member (a) and the sealing member (b) in which the battery main body is enclosed and which has a peripheral collar portion comprising the peripheral collar portion (a-i) and the peripheral collar portion (b-i) which are mated.

(3). The battery vessel obtained in the above (2) was positioned on an X-Y table capable of being freely moved in an X-axis direction and also in a Y-axis direction, and while retaining the peripheral collar portion [comprising the peripheral collar portion (a-i) and the peripheral collar portion (b-i)] of the battery vessel by means of a retaining jig, the peripheral collar portion (a-i) and the peripheral collar portion (b-i) constituting the peripheral collar portion of the battery vessel were intermittently welded at an interval of 2 mm by means of a YAG laser welding machine at an energy of 1.4 J, a pulse irradiation time of 2 m·second, and a pulsating frequency of 1 pps (pulse per second) while moving the X-Y table. Thereafter, the retaining jig was detached, and the welding by the YAG laser welding machine was conducted for the entirety of the peripheral collar portion (a-i) and the peripheral collar portion (b-i) at an energy of 1.4 J, a pulse irradiation time of 2 m·second, and a pulsating frequency of 25 pps while moving the X-Y table at a moving speed of 2.0 mm/second, whereby the peripheral collar portion (a-i) and the peripheral collar portion (b-i) constituting the peripheral collar portion of the battery vessel were sufficiently welded to tightly seal the peripheral collar portion of the battery vessel.

Thus, there was obtained a thin type rechargeable lithium battery.

In this way, there were prepared six thin type rechargeable lithium batteries.

EXAMPLE 2

The procedures of Example 1 were repeated, except that the preparation of the anode in the step 2 in Example 1 was conducted as will be described below, to obtain five thin type rechargeable lithium batteries.

Preparation of Anode:

60 parts by weight of a powdery tin material having an average particle size of 3 μm as an anode active material and 5 parts by weight of carboxymethyl cellulose as a binder were mixed to obtain a mixture. The mixture was mixed with 35 parts by weight of deionized water as a solvent to obtain a paste having a viscosity of 2000 cps. The past was applied onto opposite sides of a copper foil having a thickness of 12 μm as a collector, followed by subjecting to drying thereby to form a coat layer on each of the opposite sides of the aluminum foil. The resultant obtained was subjected to pressing to obtain an element having a thickness of 180 μm which comprises the copper foil sandwiched between the two layers each as an anode active material layer. The element thus obtained was cut to obtain seven anodes having a size of 52 mm×70 mm, which were used in the formation of six cell units each comprising a separator sandwiched between a cathode and an anode upon the preparation of a battery main body.

EXAMPLE 3

The procedures of Example 1 were repeated, except that without using the separators and the electrolyte solution, a solidified electrolyte material layer was formed on the surface of each cathode and also on the surface of each anode as will be described below, to obtain five thin type rechargeable lithium batteries.

On the opposite surfaces of each of six cathodes having a size of 52 mm ×70 mm prepared in the same manner as in the step 1 in Example 1 and also on the opposite surfaces of each of seven anodes having a size of 52 mm ×70 mm prepared in the same manner as in the step 2 in Example 1, a coating liquid obtained by mixing 70 parts by weight of methoxypolyethylene glycol monoacrylate and 30 parts by weight of polyethylene glycol dimethacrylate to obtain a mixture and mixing said mixture with 400 parts by weight of an electrolyte solution obtained by dissolving 1 M (mol/liter) of lithium hexafluorophosphate dissolved in 1 liter of a mixed solvent obtained by mixing ethylene carbonate and dimethoxy ethane at an equivalent mixing ratio and 0.3 part by weight of 2,2-dimethoxy-2-phenylacetophenone was applied, followed by subjecting to irradiation of ultraviolet rays, whereby a solidified electrolyte material layer having a thickness of 12.5 μm [this thickness is corresponding to a half of the thickness (25 μm) of the polypropylene porous film as the separator used in the step 3-(3) in Example 1] on each of the opposite surfaces of each of the six cathodes and also on each of the opposite surfaces of each of the seven anodes.

The remaining procedures were conducted as in Example 1.

EXAMPLE 4

The procedures of Example 1 were repeated, except for the following point, to obtain five thin type rechargeable lithium batteries.

In the step 5-(2) in Example 1, when the cathode leads (comprising the aluminum ribbon) of the battery main body were together fixed to the cathode power output terminal exposed from the lower side face of the insulating portion by way of ultrasonic welding, a 50 μm thick clad member comprising an aluminum layer and a nickel layer stacked was fixed to the cathode power output terminal by welding the nickel layer side thereof with the cathode power output terminal by way of ultrasonic welding and the aluminum layer side of the clad member was welded with the cathode leads (comprising the aluminum ribbon) by way of ultrasonic welding.

The remaining procedures were conducted as in Example 1.

COMPARATIVE EXAMPLE 1

Figure 11:
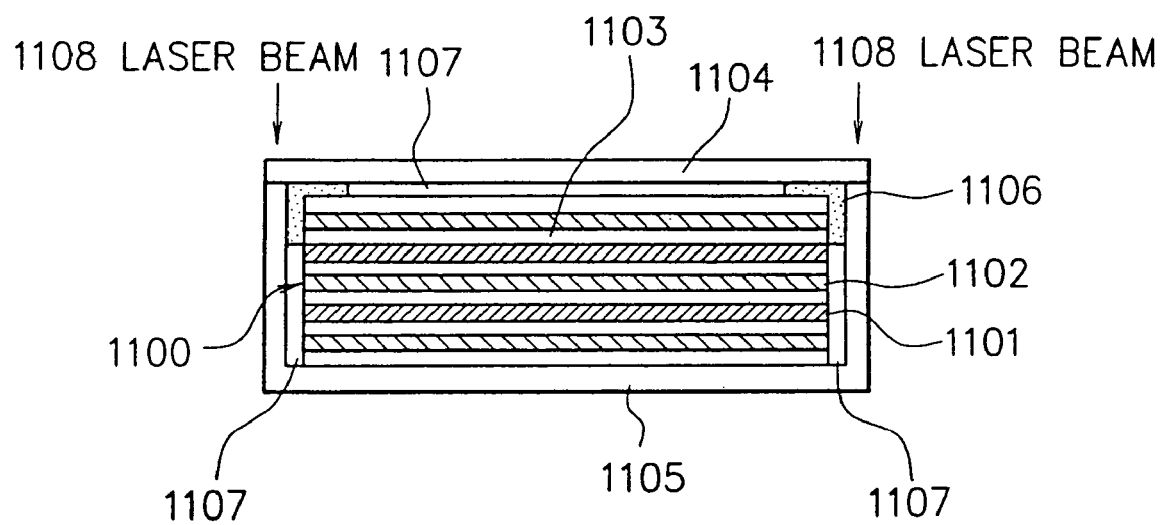
FIG. 11 is a schematic cross-sectional view illustrating another example of a conventional rechargeable lithium battery.

In this comparative example, there was prepared a thin type rechargeable lithium battery having such configuration as shown in FIG. 11 in the following manner.

The procedures of the steps 1 to 3 in Example 1 were repeated to obtain a battery main body (1100).

There was prepared a battery vessel (1105) by processing a 0.5 mm thick stainless steel plate by way of deep drawing using a die.

The battery main body (1100) obtained in the above was accommodated in the battery vessel (1105). Then, a 0.1 mm thick heat shielding member (1106) made of stainless steel was arranged on the battery main body (1100) as shown in FIG. 11. Thereafter, an electrolyte solution obtained by dissolving 1 M (mol/liter) of lithium hexafluorophosphate dissolved in 1 liter of a mixed solvent obtained by mixing propylene carbonate and dimethyl carbonate at an equivalent mixing ratio was introduced into the battery vessel (1105) to impregnate the separators (1103) of the battery main body (1100) with the electrolyte solution.

Thereafter, a cover (1104) having a terminal takeout opening was capped on the battery vessel (1105), and the cover (1104) was welded with the battery vessel (1105) using a YAG laser welding machine.

In the above, it was made possible to separately take out the cathode leads and the anode leads of the battery main body (1100) through the terminal takeout opening of the cover (1104). The cathode leads and the anode leads of the battery main body (1100) were taken out through the terminal takeout opening of the cover (1104) to form a pair of power output terminals. To insulate the terminals from the battery vessel was conducted by spraying a liquefied polyethylene resin to the terminals.

Thus, there was obtained a thin type rechargeable lithium battery having such configuration as shown in FIG. 11.

In this way, there were prepared six thin type rechargeable lithium batteries.

COMPARATIVE EXAMPLE 2

The procedures of Comparative Example 1 were repeated, except that the anodes of the battery main body (1100) were prepared in the same manner as in Example 2, to obtain five thin type rechargeable lithium batteries.

COMPARATIVE EXAMPLE 3

The procedures of Comparative Example 1 were repeated, except that without using the separators and the electrolyte solution, a solidified electrolyte material layer was formed on each of the opposite surfaces of each of the cathodes and also on each of the opposite surfaces of each of the anodes in the same manner as in Example 3, to obtain five thin type rechargeable lithium batteries.

COMPARATIVE EXAMPLE 4

The procedures of Comparative Example 1 were repeated, except that no heat shielding member was used, to obtain six thin type rechargeable lithium batteries.

Evaluation

1. For the five rechargeable lithium batteries obtained in each of Examples 1 to 4 and Comparative Examples 1 to 4, evaluation was conducted with respect to battery characteristics in the following manner.

Each rechargeable lithium battery is subjected to the following charging and discharging cycle test using a charge-discharge system BT-2043 (produced by Arbin Instruments). That is, a cycle in that constant-current charging is performed for 3 hours such a manner that charging is performed at a constant electric current of 1 A until the battery voltage reaches 4.2 V and a given electric current is flown so as to maintain said voltage; a pause for 10 minutes is taken; discharging is performed until the battery voltage reaches 2.5 V at an electric current of 1 A; and a pause for 10 minutes is taken, is repeated many times, wherein the repeated cycle number of the charging and discharging cycle when the battery suffers internal shorts (among the cathode and the anode) is examined.

The evaluated results are collectively shown in Table 4. Particularly, in Table 4, the repeated number of the charging and discharging cycle when the rechargeable lithium battery became suffered internal shorts in each case is shown. The figure in Table 4 is a sum total of the rechargeable lithium battery(s) suffered internal shorts after a certain repeated cycle number of the charging and discharging cycle.

From the evaluated results, there were found the following facts. That is, all the five rechargeable lithium batteries obtained in each of Examples 1 to 4 did not suffer internal shorts even when the charging and discharging cycle was repeated 500 times. For the rechargeable lithium batteries obtained in Comparative Example 2, two of them suffered internal shorts until 100th repetitive cycle, and all of them suffered internal shorts until 200th repetitive cycle. The rechargeable lithium batteries obtained in Comparative examples 1 and 3 were not so deteriorated as in the case of Comparative Example 2 but all of them suffered internal shorts until 400th repetitive cycle. These rechargeable lithium batteries were examined by decomposing them. As a result, it was found that the separators or the solidified electrolyte material layers as the ion conductors (or the isolators) were partially damaged in each case. The cause for this is considered such that the active materials (the cathode active materials or/and the anode active materials) were volume-expanded to apply a stress to the heat shielding member.

TABLE 1

| rechargeable lithium battery obtained | number of rechargeable lithium battery in which the anode and the cathode were internally shorted | | | | | |
|---|---|---|---|---|---|---|
| | $1^{st}$ cycle | $100^{th}$ cycle | $200^{th}$ cycle | $300^{th}$ cycle | $400^{th}$ cycle | $500^{th}$ cycle |
| Example 1 | 0 | 0 | 0 | 0 | 0 | 0 |
| Example 2 | 0 | 0 | 0 | 0 | 0 | 0 |
| Example 3 | 0 | 0 | 0 | 0 | 0 | 0 |
| Example 4 | 0 | 0 | 0 | 0 | 0 | 0 |
| Comparative Example 1 | 0 | 1 | 1 | 3 | 5 | — |
| Comparative Example 2 | 0 | 2 | 5 | — | — | — |

TABLE 1-continued

| rechargeable lithium | number of rechargeable lithium battery in which the anode and the cathode were internally shorted | | | | | |
|---|---|---|---|---|---|---|
| battery obtained | 1st cycle | 100th cycle | 200th cycle | 300th cycle | 400th cycle | 500th cycle |
| Comparative Example 3 | 0 | 1 | 2 | 4 | 5 | — |

2. Each of the rechargeable lithium battery obtained in Example 1, that obtained in Comparative Example 1, and that obtained in Comparative Example 4 was evaluated in the following manner using aforesaid charge-discharge system BT-2043.

For each rechargeable lithium battery, constant-current charging is performed for 3 hours such a manner that charging is performed at a constant electric current of 1 A until the battery voltage reaches 4.2 V and a given electric current is flown so as to maintain said voltage. Thereafter, while measuring the battery voltage, the entire surface of the battery is pressed by means of an oil hydraulic press, wherein a load when the battery voltage is suddenly decreased is measured.

As a result, for the rechargeable lithium battery of Example 1, no sudden decrease in the battery voltage was occurred until a load of 49 MPa. On the other hand, for the rechargeable lithium battery of Comparative Example 1, sudden decrease in the battery voltage was occurred at a load of 4.9 MPa, and for the rechargeable lithium battery of Comparative Example 4, sudden decrease in the battery voltage was occurred already even at a load of 0.98 MPa.

From the evaluated results, the rechargeable lithium battery of the present invention was found to excel in withstand load.

EXAMPLE 5

The procedures of Example were repeated, except that the sealing member (b) was replaced by a rectangular plat sealing member with no concave portion made of a stainless steel and which has a thickness of 0.15 mm, and a longitudinal length of 88 mm and a lateral length of 56 mm, and has a peripheral collar portion with a width of 2 mm which is corresponding to the collar portion (a-i) of the sealing member (a), to obtain six thin type rechargeable lithium batteries.

The five rechargeable lithium batteries were evaluated in the same manner as that described in the foregoing evaluation 1. As a result, all the rechargeable lithium batteries were not suffered internal shorts even when the charging and discharging cycle was repeated 500 times.

The remaining rechargeable lithium battery was evaluated in the same manner as that described in the foregoing evaluation 2. As a result, no sudden decrease in the battery voltage was occurred until a load of 30 MPa.

What is claimed is:

1. A process for producing a rechargeable lithium battery, comprising the steps of:

providing a battery main body comprising at least a cathode, an anode, and an ion conductor, a first sealing member (a) having a concave portion with a peripheral portion surrounding said concave portion and a peripheral collar portion (a-i) at said peripheral portion of said concave portion, and a second sealing member (b) having a peripheral collar portion (b-i) at a region thereof which is corresponding to said peripheral portion of said first sealing member (a);

arranging said battery main body in said concave portion of said first sealing member (a);

mating said first sealing member (a) with said second sealing member (b) to oppose to each other such that the face of said concave portion of said first sealing member (a) is faced to said second sealing member (b) through said battery main body; and mutually welding said collar portion (a-i) of said first sealing member (a) and said collar portion (b-i) of said second sealing member (b), wherein said concave portion is shaped to have a cross-section in a substantially symmetrical trapezoidal form, and a side face of said concave portion has an inclination angle of 5° to 45° from a vertical axis, and wherein the first and second sealing members are provided prior to arranging said battery main body in said concave portion.

2. The process according to claim 1, wherein as said second sealing member (b), there is used a sealing member having a concave portion with a peripheral portion suffounding said concave portion and a peripheral collar portion at said peripheral portion of said concave portion.

3. The process according to claim 1, which includes a step of arranging a power output terminal comprising a cathode power output terminal and an anode power output terminal having an electrical continuity with said battery main body and an insulating portion for insulating said power output terminal in said concave portion of said first sealing member (a).

4. The process according to claim 1, wherein to mutually weld said peripheral collar portion (a-i) and said peripheral collar portion (b-i) is conducted by way of laser beam welding, electron beam welding, resistance welding, or ultrasonic welding.

5. The process according to claim 3, wherein said insulating portion is formed to integrate with said cathode power output terminal and said anode power output.

* * * * *